(12) United States Patent
Nania

(10) Patent No.: US 11,926,200 B2
(45) Date of Patent: Mar. 12, 2024

(54) REAR CLOSURE ASSEMBLY FOR VEHICLE INCLUDING LIFTGATE AND TAILGATE MOVEABLE BY COMMON ACTUATOR

(71) Applicant: Ford Global Technologies, LLC, Dearborn, MI (US)

(72) Inventor: Adrian Nania, Rochester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 53 days.

(21) Appl. No.: 17/326,419

(22) Filed: May 21, 2021

(65) Prior Publication Data

US 2022/0371413 A1 Nov. 24, 2022

(51) Int. Cl.
  *B60J 5/10* (2006.01)
  *B62D 33/027* (2006.01)
  *B62D 33/03* (2006.01)

(52) U.S. Cl.
  CPC .......... *B60J 5/102* (2013.01); *B62D 33/0276* (2013.01); *B62D 33/03* (2013.01)

(58) Field of Classification Search
  CPC ........... B60J 5/102; B60J 5/103; B62D 33/03; B62D 33/0276
  USPC ................................. 296/56, 57, 146.8, 57.1
  See application file for complete search history.

(56) References Cited

U.S. PATENT DOCUMENTS

| | | | |
|---|---|---|---|
| 5,692,792 A * | 12/1997 | Klar (minor) .......... | B60R 5/042 296/37.16 |
| 6,220,649 B1 * | 4/2001 | Rife ........................ | B60J 5/101 296/146.12 |
| 6,454,341 B2 | 9/2002 | Tolinski | |
| 6,505,882 B1 * | 1/2003 | Morbach .................... | B60J 5/12 296/146.13 |
| 6,719,356 B2 * | 4/2004 | Cleland ................. | E05F 1/1091 49/339 |
| 7,401,832 B2 * | 7/2008 | Yui ......................... | E05D 5/062 296/57.1 |
| 7,503,619 B2 * | 3/2009 | Werner .................... | B60J 5/107 296/51 |
| 7,547,058 B2 * | 6/2009 | King ........................ | B60J 5/101 296/146.8 |
| 7,735,890 B2 * | 6/2010 | Pollak ...................... | B60J 5/103 296/57.1 |
| 9,606,546 B2 * | 3/2017 | Mayr .................... | E05F 15/611 |

(Continued)

FOREIGN PATENT DOCUMENTS

GB 2375998 B 12/2002

*Primary Examiner* — Jason S Morrow
(74) *Attorney, Agent, or Firm* — Vichit Chea; Carlson, Gaskey & Olds, P.C.

(57) ABSTRACT

This relates to a vehicle including a rear closure assembly having a liftgate and a tailgate. The liftgate and the tailgate are moveable by a common actuator. In one embodiment, a vehicle includes a liftgate moveable between a liftgate closed position and a liftgate open position to selectively cover and uncover a first portion of a rear opening in a body of the vehicle, a tailgate moveable between a tailgate closed position and a tailgate open position to selectively cover and uncover a second portion of the rear opening, and an actuator mechanically coupled to both the liftgate and the tailgate. The actuator is configured to move the liftgate between the liftgate closed position and the liftgate open position, and the actuator is configured to move the tailgate between the tailgate closed position and the tailgate open position.

16 Claims, 4 Drawing Sheets

(56) References Cited

U.S. PATENT DOCUMENTS

| | | | |
|---|---|---|---|
| 9,636,978 B2 | 5/2017 | Warburton et al. | |
| 9,909,347 B2* | 3/2018 | Warburton | B60J 5/103 |
| 10,774,571 B2* | 9/2020 | Zeabari | B60J 5/102 |
| 2004/0036318 A1* | 2/2004 | Maeda | B60J 5/103 |
| | | | 296/106 |
| 2009/0121516 A1* | 5/2009 | Ljungqvist | B60J 5/101 |
| | | | 296/146.8 |
| 2020/0378170 A1* | 12/2020 | Kerr | B60J 5/102 |
| 2021/0354537 A1* | 11/2021 | Kneifl | B62D 33/0273 |

* cited by examiner

REAR CLOSURE ASSEMBLY FOR VEHICLE INCLUDING LIFTGATE AND TAILGATE MOVEABLE BY COMMON ACTUATOR

TECHNICAL FIELD

This disclosure relates to a vehicle including a rear closure assembly having a liftgate and a tailgate. The liftgate and the tailgate are moveable by a common actuator.

BACKGROUND

Minivans, sport utility vehicles (SUVs), hatchbacks, and other vehicles have an opening defined in a rear portion of the vehicle's body. Ordinarily, these vehicles include liftgates that are used to selectively open and close the opening in the rear portion of the vehicle. Some liftgates are powered liftgates, which are opened and closed by an automated system. Other liftgates are manually opened and closed by a user.

SUMMARY

A vehicle according to an exemplary aspect of the present disclosure includes, among other things, a liftgate moveable between a liftgate closed position and a liftgate open position to selectively cover and uncover a first portion of a rear opening in a body of the vehicle, a tailgate moveable between a tailgate closed position and a tailgate open position to selectively cover and uncover a second portion of the rear opening, and an actuator mechanically coupled to both the liftgate and the tailgate. The actuator is configured to move the liftgate between the liftgate closed position and the liftgate open position, and the actuator is configured to move the tailgate between the tailgate closed position and the tailgate open position.

In a further embodiment of the foregoing vehicle, the actuator is a linear actuator incorporated into a strut, the actuator is configured to selectively expand and retract the strut, and a first end of the strut is connected to the liftgate.

In a further embodiment of any of the foregoing vehicles, the vehicle includes a linear slide including a carriage configured to move relative to a guide between a first position and a second position. Further, a second end of the strut is connected to the carriage, and the second end of the strut is opposite the first end.

In a further embodiment of any of the foregoing vehicles, the vehicle includes a link including first and second opposed ends. Further, the first end of the link is connected to the carriage and the second end of the link is connected to the tailgate.

In a further embodiment of any of the foregoing vehicles, when the carriage is in the first position, the tailgate is in the tailgate closed position, and, when the carriage is in the second position, the tailgate is in the tailgate open position.

In a further embodiment of any of the foregoing vehicles, a spring configured to bias the carriage to the first position.

In a further embodiment of any of the foregoing vehicles, when the liftgate and the tailgate are in the respective liftgate and tailgate closed positions, the liftgate is configured to move toward the liftgate open position in response to expansion of the strut, and, when the liftgate is in the liftgate open position, the tailgate is configured to move toward the tailgate open position in response to expansion of the strut.

In a further embodiment of any of the foregoing vehicles, the vehicle includes a hinge configured to prevent movement of the liftgate beyond the liftgate open position.

In a further embodiment of any of the foregoing vehicles, when the liftgate is in the liftgate open position, expansion of the strut moves the carriage toward the second position against the force of the spring.

In a further embodiment of any of the foregoing vehicles, the liftgate is vertically above the tailgate.

In a further embodiment of any of the foregoing vehicles, the liftgate is rotatable about an axis adjacent a top of the rear opening, and the tailgate is rotatable about an axis adjacent a bottom of the rear opening.

A method according to an exemplary aspect of the present disclosure includes, among other things, moving a liftgate to a liftgate open position using an actuator, and moving a tailgate to a tailgate open position using the actuator.

In a further embodiment of the foregoing method, the step of moving the liftgate to the liftgate open position occurs before the step of moving the tailgate to the tailgate open position.

In a further embodiment of any of the foregoing methods, the actuator is a linear actuator incorporated into a strut, the linear actuator is configured to expand and retract the strut, the strut includes a first end and a second end opposite the first end, and the first end of the strut is connected to the liftgate.

In a further embodiment of any of the foregoing methods, the second end of the strut is connected to a carriage of a linear slide, and a link connects the carriage to the tailgate.

In a further embodiment of any of the foregoing methods, a spring is arranged relative to the carriage, and the spring is configured such that the step of moving the liftgate to the liftgate open position does not result in movement of the tailgate.

In a further embodiment of any of the foregoing methods, when the liftgate is in the liftgate open position, expansion of the strut results in movement of the tailgate to the open position.

In a further embodiment of any of the foregoing methods, when the liftgate is in the liftgate open position, a hinge prevents rotation of the liftgate beyond the liftgate open position.

In a further embodiment of any of the foregoing methods, the method includes moving the liftgate to the liftgate closed position using the actuator, and moving the tailgate to a tailgate closed position using the actuator.

In a further embodiment of any of the foregoing methods, the step of moving the tailgate to the tailgate closed position occurs before the step of moving the liftgate to the liftgate closed position.

BRIEF DESCRIPTION OF THE DRAWINGS

In FIG. 1, the liftgate and tailgate are in respective closed positions.

In FIG. 4, a carriage of the linear slide is in a first position.

In FIG. 6, the carriage of the linear slide is in a second position.

DETAILED DESCRIPTION

This disclosure relates to a vehicle including a rear closure assembly having a liftgate and a tailgate. The liftgate and the tailgate are moveable by a common actuator. In one embodiment of this disclosure, a vehicle includes a liftgate moveable between a liftgate closed position and a liftgate open position to selectively cover and uncover a first portion of a rear opening in a body of the vehicle, a tailgate moveable between a tailgate closed position and a tailgate open position to selectively cover and uncover a second portion of the rear opening, and an actuator mechanically coupled to both the liftgate and the tailgate. The actuator is configured to move the liftgate between the liftgate closed position and the liftgate open position, and the actuator is configured to move the tailgate between the tailgate closed position and the tailgate open position. Among other benefits, which will be appreciated from the below description, this design uses fewer components leading to reduced cost and weight relative to other designs which include separate, dedicated actuators for liftgates and tailgates. Further, the design requires less electrical architecture and draws less current than designs with separate actuators.

Figure 1:
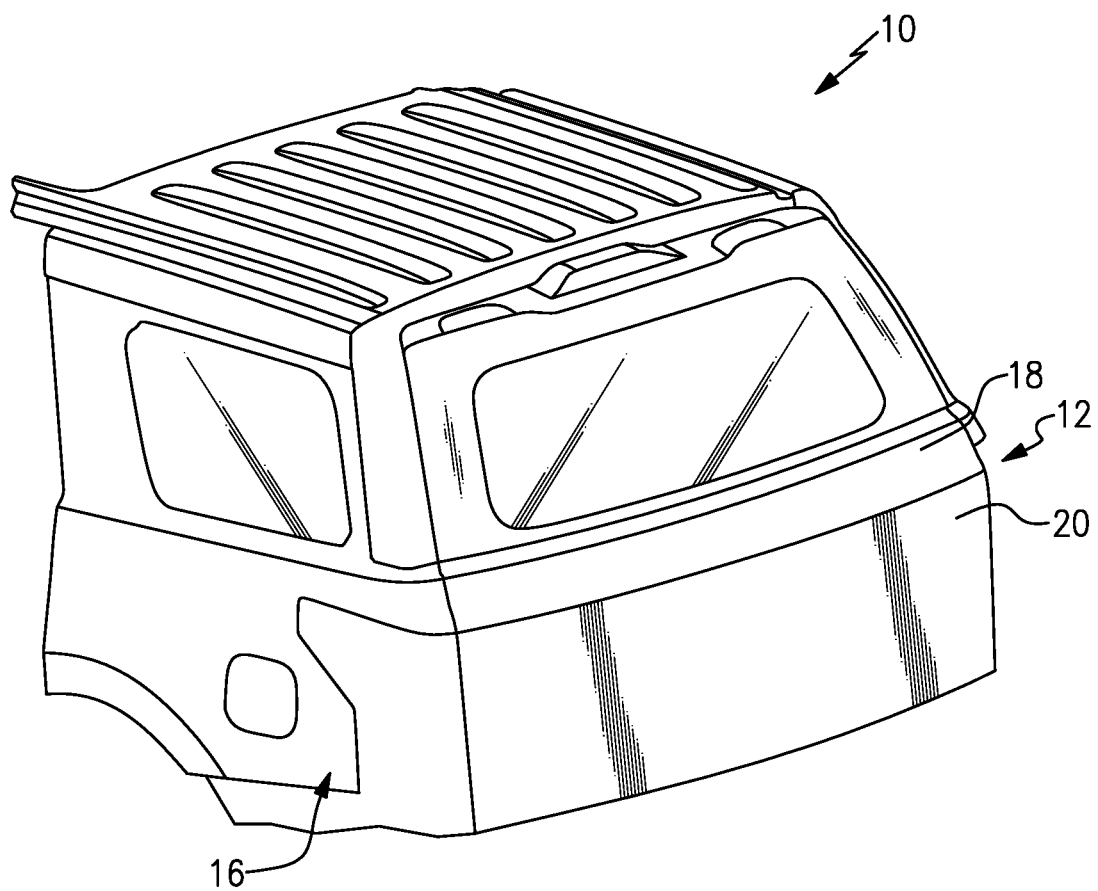
FIG. 1 is a rear-perspective view of a portion of a vehicle including a rear closure assembly, which includes a liftgate and a tailgate.

Referring to the drawings, FIG. 1 is a rear-perspective view of a motor vehicle 10 ("vehicle 10"), which is shown as a sport utility vehicle (SUV), including an example rear closure assembly 12 configured to selectively cover and uncover a rear opening 14 (FIG. 2) in the body 16 of the vehicle 10. While FIG. 1 shows an SUV, this disclosure is not limited to SUVs and extends to other types of vehicles, including minivans, hatchbacks, etc. Further, as used in this disclosure, the body 16 refers to the frame (including pillars) and paneling of the vehicle 10.

The rear closure assembly 12, in this disclosure, includes a liftgate 18 and a tailgate 20. The liftgate 18 is vertically above the tailgate 20 and is moveable between a liftgate closed position (FIG. 1) and a liftgate open position (FIG. 2) by rotating about an axis $A_1$ adjacent a top of the rear opening 14. The tailgate 20 is vertically below the liftgate 18 and is moveable between a tailgate closed position (FIG. 1) and a tailgate open position (FIG. 2) by rotating about an axis A2 adjacent a bottom of the rear opening 14. The tailgate 20 may slide in a direction normal to the axis A2 while rotating, in some examples.

The liftgate 18 and the tailgate 20 are each configured to selectively cover a portion of the rear opening 14. When the liftgate 18 and tailgate 20 are both in their respective closed positions, as in FIG. 1, the liftgate and 18 and tailgate 20 meet along a height of the rear opening 14 and fully close the rear opening 14. The liftgate 18 and tailgate 20 may be attachable to one another using a latch assembly. Specifically, the liftgate 18 may be connected to the tailgate 20 using a latch arranged adjacent an upper edge of the tailgate 20. Further, the tailgate 20 may be attached to the body 16 of the vehicle 10 by latches at opposing sides of the tailgate 20.

The rear closure assembly 12, in this example, is a powered assembly and is able to be opened and closed by an actuator without requiring a user to manually apply force of the liftgate 18 or tailgate 20. The powered assembly may be activated by a user by pressing a button on a keyfob, within the vehicle 10, on the rear closure assembly 12, as examples, or may be activated in some other manner. While powered movements are contemplated herein, the rear closure assembly 12 could be opened and closed manually. Further, initial manual movements of either the liftgate 18 or tailgate 20 could trigger the powered assembly and the remainder of a movement to a closed or open position could be performed using the powered assembly.

Figure 3:
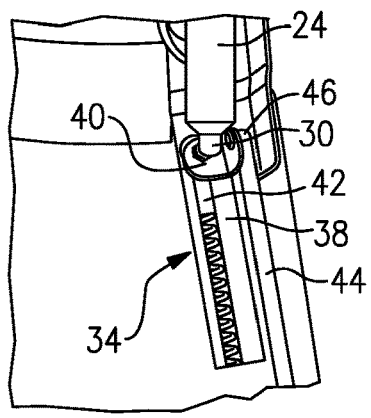
FIG. 3 is a close-up view of a portion of a strut and linear slide, among other components, from a first side.
Figure 8:
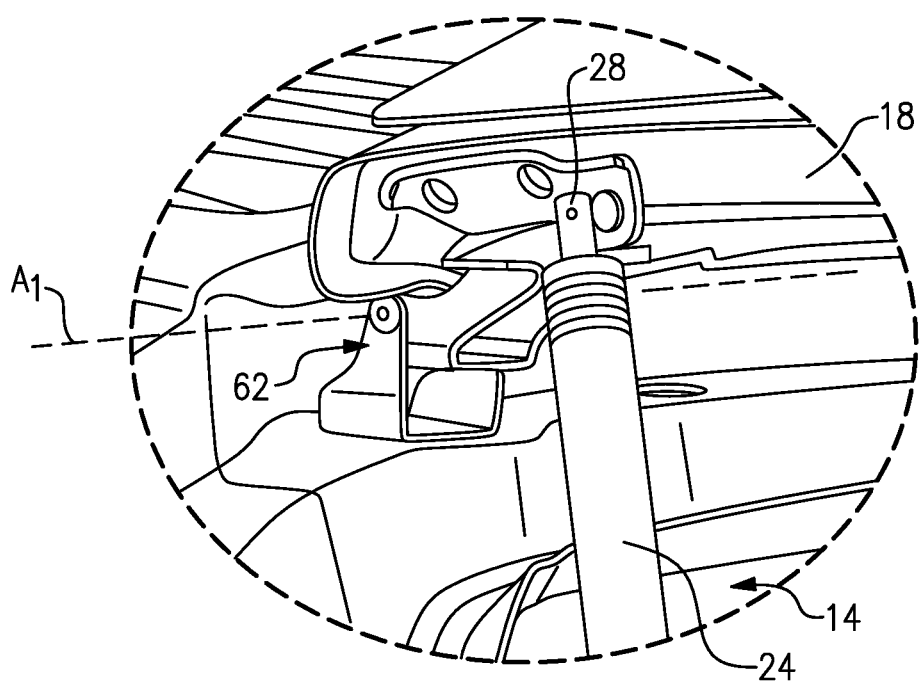
FIG. 8 is a close-up view of a hinge connection between a body of the vehicle and the liftgate.

The powered assembly in this example includes an actuator 22 which receives instructions from a controller 24. The actuator 22 is a linear actuator incorporated into a strut 26. In this regard, the strut 26 may be referred to as a powered strut. The strut 26 is arranged along a side of the rear opening 14 and includes a first end 28 connected to the liftgate 18 adjacent the axis $A_1$ (FIG. 8) and a second end 30 opposite the first end 28 (FIG. 3). A strut 32 connects the liftgate 18 to the body 16 on an opposite side of the rear opening. The strut 32 is not a powered strut and instead passively facilitates movement of the liftgate 18.

Figure 2:
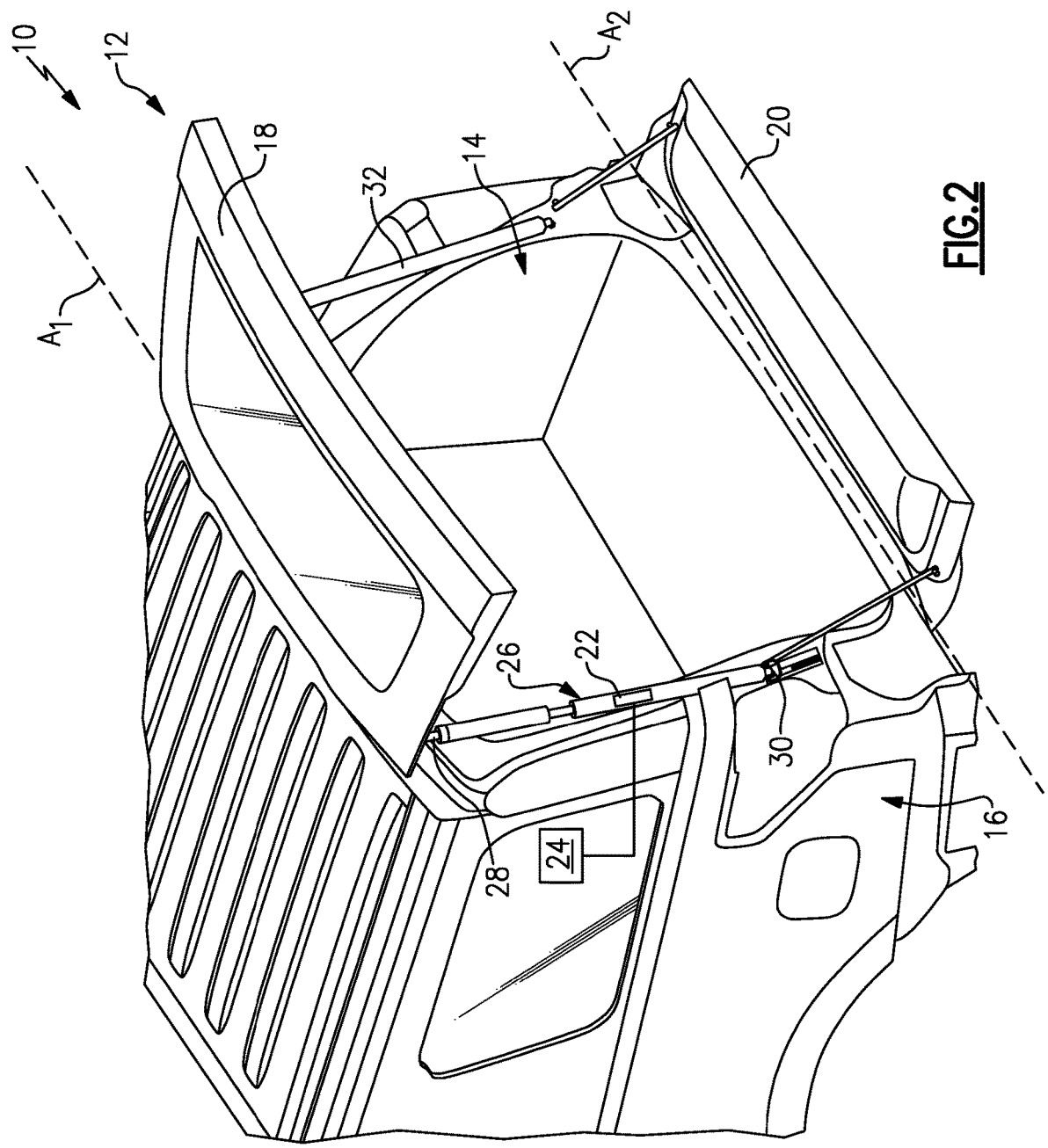
FIG. 2 is a rear-perspective view of the portion of the vehicle of FIG. 1 with the liftgate and tailgate in respective open positions.

The controller 24 is shown schematically in FIG. 2. It should be understood that the controller 24 could be part of an overall vehicle control module, such as a vehicle system controller (VSC), or could alternatively be a stand-alone controller separate from the VSC. The controller 24 may be programmed with executable instructions for interfacing with and operating the various components of the vehicle 10. Further, the controller 24 includes a processing unit and non-transitory memory for executing the various control strategies and modes of the vehicle system.

In an example, the actuator 22 is a linear actuator including a motor and configured to convert rotational motion into linear, straight movements along the length of the strut 26. In particular, the actuator 22 is responsive to instructions from the controller 24 to expand and retract the strut 26.

In this disclosure, both the liftgate 18 and the tailgate 20 are powered by a common actuator, namely the actuator 22. A number of components, which will now be described, facilitate movement of both the liftgate 18 and the tailgate 20 by the actuator 22.

Figure 4:
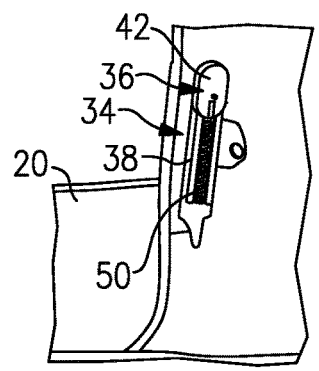
FIG. 4 is a close-up view of a portion of the linear slide from a second side opposite the first side.
Figure 5:
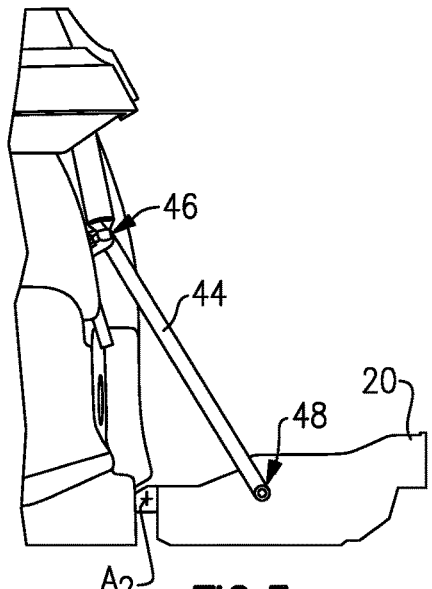
FIG. 5 is a side view illustrating, among other things, a link between a tailgate and the linear slide.

With reference to FIGS. 3 and 4, adjacent the second end 30, the strut 26 is connected to a linear slide 34. Specifically, the linear slide 34 includes a carriage 36 and a guide 38. The carriage 36 is configured to slide along the guide 38. The guide 38 is fixedly mounted to the body 16 and the strut 26 is mounted to the carriage 36. The carriage 36 includes an L-shaped plate 40 on a first side of the guide 38, and a block 42 on a second side of the guide 38. The L-shaped plate 40 and block 42 are fixed relative to one another and are configured to slide as one unit along the guide 38. The plate 40 is connected to the strut 26 and is also connected to a link 44. A first end 46 of the link 44 is connected to the plate 40 and a second end 48 of the link 44 is connected to the tailgate 20, as shown in FIG. 5. A stay cable or passive link connects the tailgate 20 to the body 16 on an opposite side of the tailgate 20 as the link 44.

Figure 6:
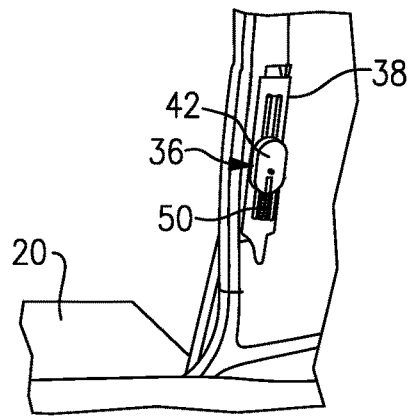
FIG. 6 is a close-up view of a portion of the linear slide from the second side.
Figure 7:
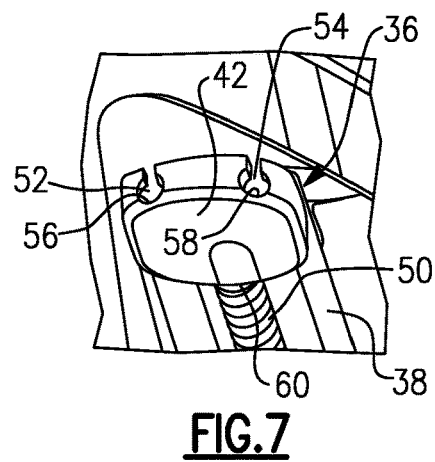
FIG. 7 is a close-up view of a portion of the linear slide, including the relationship between the carriage, a guide, and a spring.

The carriage 36 is moveable linearly along the guide 38 between a first position (FIG. 4) and a second position (FIG. 6). The second position is vertically below the first position, in this example. The linear slide 34 includes a spring 50 located below the carriage 36 between spaced-apart rails 52, 54 of the guide 38. The spring 50 urges the carriage 36 to the first position. The block 42 includes channels 56, 58 corresponding to the rails 52, 54 (FIG. 7) and also includes a central portion 60 between channels 56, 58 configured to directly contact the spring 50. The spring 50 is a coil spring, in this example, but could be replaced with a gas spring or another type of biasing member.

In this disclosure, when the liftgate 18 and tailgate 20 are both in their respective closed positions, initial activation of the actuator 22 results in movement of the liftgate 18 to its open position while the tailgate 20 remains stationary. This is due to the force of the spring 50 on the carriage 36, which resists movement of the actuator 22 until the liftgate 18 reaches the liftgate open position. In the liftgate open position, a hinge 62 (FIG. 8) connecting the liftgate 18 to the body 16 prevents continued rotation of the liftgate 18 relative to the body 16 beyond the liftgate open position. In a particular example, the hinge 62 may include a stop beyond which the liftgate 18 cannot continue to rotate. With the liftgate 18 prevented from further rotation by the hinge 62, continued expansion of the strut 26 begins to move the carriage 36 from the first position downwardly toward the second position, overcoming the force of the spring 50, and ultimately moving the tailgate 20 to the tailgate open position. Eventually, the tailgate 20 reaches the tailgate open position of FIG. 2. The liftgate 18 and tailgate 20 rotate about 90° between respective open and closed positions. To close the liftgate 18 and tailgate 20, the process is reversed, with the actuator 22 retracting the strut 26, leading first to movement of the tailgate 20 to the tailgate closed position and second to movement of the liftgate 18 to the liftgate 18 closed position.

It should be understood that terms such as "about," "substantially," and "generally" are not intended to be boundaryless terms, and should be interpreted consistent with the way one skilled in the art would interpret those terms. Further, terms such as "rearward," "upper," and "lower" are used herein for purposes of explanation only, and refer to the normal operational attitude of a vehicle.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A vehicle, comprising:
a liftgate moveable between a liftgate closed position and a liftgate open position to selectively cover and uncover a first portion of a rear opening in a body of the vehicle;
a tailgate moveable between a tailgate closed position and a tailgate open position to selectively cover and uncover a second portion of the rear opening; and
an actuator mechanically coupled to both the liftgate and the tailgate, wherein the actuator is configured to move the liftgate between the liftgate closed position and the liftgate open position, and wherein the actuator is configured to move the tailgate between the tailgate closed position and the tailgate open position,
wherein the actuator is a linear actuator incorporated into a strut,
wherein the actuator is configured to selectively expand and retract the strut, and
wherein a first end of the strut is connected to the liftgate, further comprising a linear slide including a carriage configured to move relative to a guide between a first position and a second position,
wherein a second end of the strut is connected to the carriage, and
wherein the second end of the strut is opposite the first end.

2. The vehicle as recited in claim 1, further comprising:
a link including first and second opposed ends, wherein the first end of the link is connected to the carriage and the second end of the link is connected to the tailgate.

3. The vehicle as recited in claim 2, wherein:
when the carriage is in the first position, the tailgate is in the tailgate closed position, and
when the carriage is in the second position, the tailgate is in the tailgate open position.

4. The vehicle as recited in claim 3, further comprising:
a spring configured to bias the carriage to the first position.

5. The vehicle as recited in claim 4, wherein:
when the liftgate and the tailgate are in the respective liftgate and tailgate closed positions, the liftgate is configured to move toward the liftgate open position in response to expansion of the strut, and
when the liftgate is in the liftgate open position, the tailgate is configured to move toward the tailgate open position in response to expansion of the strut.

6. The vehicle as recited in claim 5, further comprising:
a hinge configured to prevent movement of the liftgate beyond the liftgate open position.

7. The vehicle as recited in claim 5, wherein, when the liftgate is in the liftgate open position, expansion of the strut moves the carriage toward the second position against the force of the spring.

8. The vehicle as recited in claim 1, wherein the liftgate is vertically above the tailgate.

9. The vehicle as recited in claim 1, wherein:
the liftgate is rotatable about an axis adjacent a top of the rear opening, and
the tailgate is rotatable about an axis adjacent a bottom of the rear opening.

10. A method, comprising:
moving a liftgate to a liftgate open position using an actuator; and
moving a tailgate to a tailgate open position using the actuator,
wherein the actuator is a linear actuator incorporated into a strut,
wherein the linear actuator is configured to expand and retract the strut,
wherein the strut includes a first end and a second end opposite the first end, and
wherein the first end of the strut is connected to the liftgate
wherein the second end of the strut is connected to a carriage of a linear slide, and
wherein a link connects the carriage to the tailgate.

11. The method as recited in claim 10, wherein the step of moving the liftgate to the liftgate open position occurs before the step of moving the tailgate to the tailgate open position.

12. The method as recited in claim 10, wherein a spring is arranged relative to the carriage, and wherein the spring is configured such that the step of moving the liftgate to the liftgate open position does not result in movement of the tailgate.

13. The method as recited in claim 12, wherein, when the liftgate is in the liftgate open position, expansion of the strut results in movement of the tailgate to the open position.

14. The method as recited in claim 12, wherein, when the liftgate is in the liftgate open position, a hinge prevents rotation of the liftgate beyond the liftgate open position.

15. The method as recited in claim 10, further comprising:
   moving the liftgate to a liftgate closed position using the actuator; and
   moving the tailgate to a tailgate closed position using the actuator,
   wherein the step of moving the tailgate to the tailgate closed position occurs before the step of moving the liftgate to the liftgate closed position.

16. A vehicle, comprising:
   a liftgate moveable between a liftgate closed position and a liftgate open position to selectively cover and uncover a first portion of a rear opening in a body of the vehicle;
   a tailgate moveable between a tailgate closed position and a tailgate open position to selectively cover and uncover a second portion of the rear opening; and
   an actuator mechanically coupled to both the liftgate and the tailgate, wherein the actuator is configured to move the liftgate between the liftgate closed position and the liftgate open position, and wherein the actuator is configured to move the tailgate between the tailgate closed position and the tailgate open position,
   wherein the actuator is incorporated into a strut, wherein the strut is connected at a first end to the liftgate and at a second end to a carriage of a linear slide, and wherein a link is connected to the carriage and to the tailgate.

* * * * *